June 13, 1961

J. L. GORTNER 2,987,749

COMBINATION DUST PAN AND SHOVEL

Filed Nov. 4, 1959

INVENTOR

James L. Gortner

United States Patent Office 2,987,749
Patented June 13, 1961

2,987,749
COMBINATION DUST PAN AND SHOVEL
James L. Gortner, R.R. 1, Box 176, White Pigeon, Mich.
Filed Nov. 4, 1959, Ser. No. 850,852
2 Claims. (Cl. 15—257.7)

This invention relates to cleaning implements, and more specifically to a combination dust pan and shovel.

For reasons of economy and space, many utilitarian items are being designed for more than one purpose. Modern homes are tending to become smaller, with the result that general household utensils must be stored in a more confined space. One method of easing this situation is to reduce the number of utensils by providing new implements capable of replacing the previous need for several individual utensils. In the field of cleaning utensils there is a need for an implement which is capable of use as a dust pan or as a medium duty shovel.

It is therefore a primary object of this invention to provide a combination dust pan and shovel, capable of simple adaptation for either purpose.

It is another object of the invention to provide an implement for the above purposes which may be stored in a minimum of space in either assembled or unassembled condition.

It is a further object of the invention to provide an implement which is fitted with a novel handle which may be assembled in several different stances, each being convenient for a specific purpose.

It is a still further object of the invention to provide an implement of the above class which is simple in construction, sturdy in use, and which may be manufactured at low cost.

The invention consists of a pan having a flat base bounded on three sides by upwardly disposed side walls. The rear end of the pan which is surrounded by the above mentioned side walls has a cover secured to the top thereof. A metal strap is secured to the inner side of the rearwardly disposed side wall and provides a tubular opening to slidably receive a cranked handle which enters the opening through a hole cut in the cover. The handle is retained in the opening by a removable pin which projects from the rear of the pan through the rearwardly disposed side wall, the handle, and the encircling strap member. The handle is cranked near one end, and each end is adapted tor securing in the above opening, in such a manner that the angle of the handle with respect to the pan may be varied.

Further advantages and objects of the invention will be had from the following description of a preferred embodiment thereof taken in conjunction with the attached drawings wherein.

Like reference characters indicate corresponding parts throughout the several views in the drawing.

Figure 1:
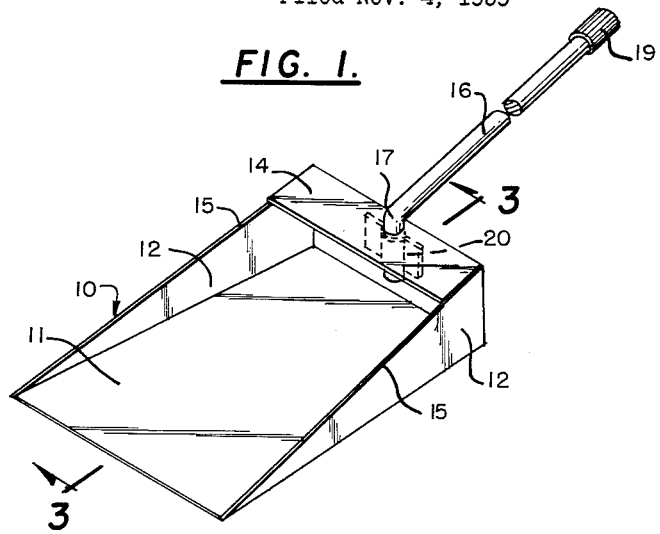
FIG. 1 is a perspective view of the pan with the handle assembled for use as a shovel.
Figure 3:
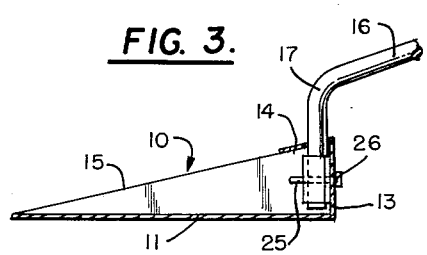
FIG. 3 is a side elevation of the pan and part of the assembled handle, showing the detail of assembly.

Referring now to the drawing, the numeral 10 represents a pan having a four sided flat base 11. Two triangular shaped side walls 12 are formed in an upstanding manner from opposite sides of the base 11. A rear wall 13 rectangular in shape, is welded to the vertical ends of the side walls 12, and a cover strip 14, also rectangular in shape, is welded to the top of the rear wall 13 and the upper ends of the sloping sides 15 of the side walls 12. This structure provides a shovel having an unobstructed forward edge, sides which increase in depth toward the rear end of the pan, and a cover forming a top wall to the rear portion thereof.

A reversible handle 16 consists of a circular tube or rod bent as at 17. The handle has a small hole 18 drilled radially through the rod at each end. A handle grip 19 is frictionally and removably retained on either end of the handle.

A metal strap 20 having a central sleeve portion 21 adapted to receive either end of the handle 16, is secured on each side by extensions 22 spot welded at points 23 to the centre of the inner face of the rear wall 13. The sleeve is open at each end and a securing pin hole 24 is drilled diametrically through the centre in horizontal alignment with a similar hole drilled through the rear wall 13. A retaining pin 25 having a head 26 is adapted to removably locate in the above mentioned holes, and also passes through one of the holes 18 drilled in each end of the handle 16 to releasably secure the handle within the sleeve.

Figure 2:
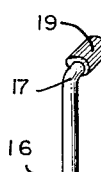
FIG. 2 is a perspective view of the pan with the handle assembled for use as a dust pan.
Figure 4:
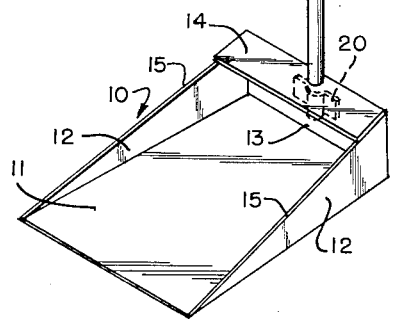
FIG. 4 is an exploded view showing the several parts involved for releasably securing the end of the handle to the pan.
Figure 4:
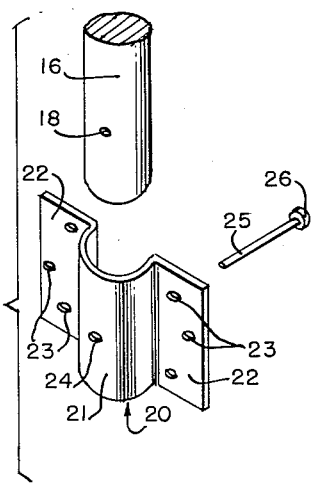
Figure 5:
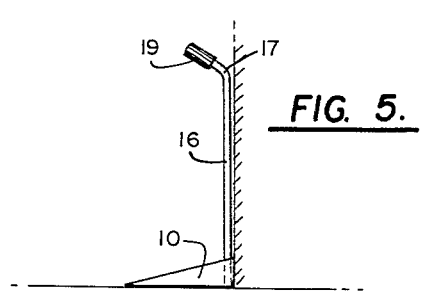
FIG. 5 is a side elevation of the pan assembled in a convenient manner for storage with a minimum of obstruction.

In operation, the handle is positioned in the most convenient manner for the particular operation. FIG. 1 and FIG. 2 show views of the pan with the handle in a convenient position for shovelling snow, coal, ashes etc. FIGS. 2 and 5 show the handle reversed in two positions suitable for dust pan use; it will be noted that in these positions stooping is avoided. FIG. 5 shows the dust pan stored against a wall and aptly demonstrates the small storage area required, and the stability of the device as compared with standard equipment of this class. The combination implement of this invention may be stored in two separate pieces if desired, a feature particularly valuable for storage in cars.

From the foregoing, it is believed that the construction and operation of the invention will be readily understood. However, since numerous modifications will occur to those skilled in the art, it is not desired to limit the construction exactly to that shown and described, and accordingly, modifications and equivalents may be resorted to, falling within the scope and spirit of the invention as defined in the appended claims.

I claim:

1. In combination, a shovel having a substantially rectangular base, side walls increasing in depth toward the rear of said base, a vertical wall joined to the deeper ends of said side walls and the rear end of said base, a strap forming a vertically disposed sleeve welded to the inner face of said end wall intermediate the ends thereof, a handle having the portion adjacent one end bent at an angle to the remainder portion, said handle one end portion or the portion adjacent the other end being insertable into and withdrawable from the upper end of said sleeve and when said one end portion is received in said sleeve the remainder portion of said handle extends rearwardly of and slopes upwardly from said base to serve as a shovel handle and when said other end portion is received in said sleeve the remainder portion of said handle extends vertically above said base to serve as a dustpan handle with said bent end portion over said base, so that said rear wall may be disclosed adjacent a vertical wall surface when said shovel is stored, and a retaining pin received in aligned holes formed through said vertical wall, either said one or other end portions of said handle and said vertical sleeve, to releasably secure either said one or other end portions of said handle within said sleeve.

2. In combination, a dust pan adaptable for use as a shovel, comprising a substantially rectangular base, side walls increasing in depth toward the rear end of said base, a vertical end wall welded to the deeper ends of said side walls and the rear end of said base, a cover closing the upper side of the rear portion formed by the end wall and the ends of said side walls, there being a hole provided in the cover adjacent said end wall, a sleeve secured to the inner face of said end wall and disposed in registry with said hole, and a handle having the portion adjacent one end bent at an angle to the remainder portion, said handle one end portion or the portion adjacent the other end being insertable into and withdrawable from the hole in said cover and into and from the upper end of said sleeve and when said one end portion is received in said sleeve the remainder portion of said handle extends rearwardly of and slopes upwardly from said base to serve as a shovel handle and when said other end portion is received in said sleeve the remainder portion of said handle extends vertically above said base to serve as a dustpan handle with said bent end portion over said base, so that said rear wall may be disposed adjacent a vertical wall surface when said pan is stored, and a retaining pin received in aligned holes formed through said vertical wall, either said one or other end portions of said handle and said vertical sleeve, to releasably secure either said one or other end portions of said handle within said sleeve.

References Cited in the file of this patent
UNITED STATES PATENTS

| | | |
|---|---|---|
| 587,607 | Ray | Aug. 3, 1897 |
| 936,990 | Epperson | Oct. 12, 1909 |